(12) United States Patent
Sankai (10) Patent No.: US 12,543,962 B2
(45) Date of Patent: Feb. 10, 2026

(54) PHYSIOLOGICAL STATE EVALUATION DEVICE

(71) Applicants: CYBERDYNE INC., Tsukuba (JP); UNIVERSITY OF TSUKUBA, Tsukuba (JP)

(72) Inventor: Yoshiyuki Sankai, Tsukuba (JP)

(73) Assignees: CYBERDYNE INC., Tsukuba (JP); UNIVERSITY OF TSUKUBA, Tsukuba (JP)

(*) Notice: Subject to any disclaimer, the term of this patent is extended or adjusted under 35 U.S.C. 154(b) by 928 days.

(21) Appl. No.: 17/258,138

(22) PCT Filed: Jul. 5, 2019

(86) PCT No.: PCT/JP2019/026880
§ 371 (c)(1),
(2) Date: Jan. 5, 2021

(87) PCT Pub. No.: WO2020/013098
PCT Pub. Date: Jan. 16, 2020

(65) Prior Publication Data
US 2021/0196134 A1    Jul. 1, 2021

(30) Foreign Application Priority Data

Jul. 10, 2018  (JP) .................................. 2018-130879

(51) Int. Cl.
*A61B 5/0205*   (2006.01)
*A61B 5/00*     (2006.01)
(Continued)

(52) U.S. Cl.
CPC .......... *A61B 5/02055* (2013.01); *A61B 5/087* (2013.01); *A61B 5/1103* (2013.01);
(Continued)

(58) Field of Classification Search
CPC .................................................. A61B 2562/16
See application file for complete search history.

(56) References Cited

U.S. PATENT DOCUMENTS

2003/0171655 A1* 9/2003 Newman ................ A61B 1/227
                                                            600/200
2006/0206014 A1* 9/2006 Ariav ....................... A61B 5/01
                                                          374/E13.002
(Continued)

FOREIGN PATENT DOCUMENTS

JP    2005-040374 A     2/2005
JP    2007-319238 A    12/2007
(Continued)

OTHER PUBLICATIONS

Japanese Office Action issued on Jun. 21, 2022 for Japanese Patent Application No. 2018-130879.
(Continued)

*Primary Examiner* — Benjamin J Klein
*Assistant Examiner* — Thien Jason Tran
(74) *Attorney, Agent, or Firm* — Volpe Koenig (57) ABSTRACT

A physiological state evaluation apparatus contacts an external auditory pore when mounted in a subject's auricle. The evaluation apparatus: collects sound vibrations generated from a larynx and a pharynx via a cartilage region of the external auditory pore; optically detects a pulsatory motion of blood through blood vessels and measures pulse rate and blood oxygen saturation, on the basis of a change in optical intensity caused by the pulsatory motion; detects brain waves and eye movements using a pair of conductive electrodes for detecting electric potentials of right and left external auditory pore surfaces; detects, sound quality, number of times, tidal volume, and rhythm of the subject's breaths on the basis of the acoustic signal; and evaluates a health condition of the subject while sleeping on the basis of
(Continued)

the respiratory condition, the pulse rate and the blood oxygen saturation, and the brain waves and the eye movements.

12 Claims, 4 Drawing Sheets

(51) Int. Cl.
- *A61B 5/087* (2006.01)
- *A61B 5/11* (2006.01)
- *A61B 5/145* (2006.01)
- *A61B 5/291* (2021.01)
- *A61B 5/369* (2021.01)
- *A61B 5/372* (2021.01)

(52) U.S. Cl.
CPC .......... *A61B 5/14542* (2013.01); *A61B 5/372* (2021.01); *A61B 5/4812* (2013.01); *A61B 2562/16* (2013.01)

(56) References Cited

U.S. PATENT DOCUMENTS

| | | | |
|---|---|---|---|
| 2010/0228315 A1 | 9/2010 | Nielsen | |
| 2015/0087894 A1* | 3/2015 | Rink | A61B 5/4812 |
| | | | 600/27 |
| 2015/0150498 A1* | 6/2015 | George | A61B 5/6817 |
| | | | 600/301 |
| 2015/0150499 A1* | 6/2015 | George | A61B 5/4818 |
| | | | 600/301 |
| 2015/0182132 A1* | 7/2015 | Harris | A61B 5/7275 |
| | | | 340/870.01 |
| 2016/0066851 A1 | 3/2016 | Inagaki et al. | |
| 2017/0258329 A1 | 9/2017 | Marsh | |
| 2018/0014741 A1 | 1/2018 | Chou | |
| 2018/0263562 A1* | 9/2018 | Laplante-Lévesque | |
| | | | A61B 5/14551 |

FOREIGN PATENT DOCUMENTS

| | | |
|---|---|---|
| JP | 2009-528140 A | 8/2009 |
| JP | 2016-002189 A | 1/2016 |
| JP | 2016-055155 A | 4/2016 |
| JP | 2018-504157 A | 2/2018 |
| KR | 10-1483065 B1 | 1/2015 |
| WO | 2014/047310 A1 | 3/2014 |
| WO | WO-2016083807 A1 * | 6/2016 ............... A61B 5/00 |
| WO | 2018/004279 A1 | 1/2018 |

OTHER PUBLICATIONS

Ashida,N. et al., "Trial of Measurement of Sleep Apnea Syndrome with Sound Monitoring and SpO2 at home", Koshien University, Takarazuka, Japan, (2009).

Davies, P. et al., "The relationship between body temperature, heart rate and respiratory rate in children", Queen's Medical Center, Nottingham, U.K. (2009).

Extended European Search Report dated Feb. 22, 2022 for European Patent Application No. 19833276.9.

International Search Report, PCT/JP2019/026880, Oct. 1, 2019, 2 pgs.

* cited by examiner

PHYSIOLOGICAL STATE EVALUATION DEVICE

TECHNICAL FIELD

The present invention relates to a technology for evaluating a subject's sleep state as their physiological state.

BACKGROUND ART

As a result of earnest examination on practicality of evaluation of a subject's sleep state as their physiological state (the subject's health condition while sleeping), inventors of the present application have found that a sensor device of an earphone type is most efficient. This is because if an ear(s) is decided as a location to mount the sensor device, biological information to be used for the evaluation of the sleep state can be measured without any problem and various kinds of biological information inside the ears can be easily acquired even if the subject moves, for example, by turning over while sleeping; and, therefore, the biological information can be acquired efficiently and the accuracy of the evaluation of the sleep state can be presumed to be high.

There are PTL 1 to PTL 4 regarding the measurement of the biological information and the evaluation of the sleep state. PTL 1 discloses that measured sleeping breath sounds are analyzed to assess the sleep state and apnea and hypopnea states while sleeping. PTL 2 discloses acoustic equipment including an earphone equipped with a sensor for measuring a blood flow, a blood pressure, and so on. PTL 3 discloses that sleep stages are decided on the basis of the subject's respiratory movements and the sleep stages are classified by analyzing nonrespiratory movements. PTL 4 discloses that at least one type of sleep physiological data among pulse waves, heartbeat, electrocardiogram, body motions, or brain waves while sleeping is measured and the sleep state is monitored on the basis of the above-mentioned data.

CITATION LIST

Patent Literature

PTL 1: Japanese Patent Application Laid-Open (Kokai) Publication No. 2016-002189
PTL 2: Japanese Patent Application Laid-Open (Kokai) Publication No. 2016-055155
PTL 3: WO 2014/047310
PTL 4: Japanese Patent Application Laid-Open (Kokai) Publication No. 2007-319238

SUMMARY OF THE INVENTION

Problems to be Solved by the Invention

As a result of further earnest examination, the inventors of the present application found that a desired earphone type of the sensor device is an auricle insertion type. This is because the biological information can be acquired efficiently and the accuracy in the evaluation of the sleep state is high, and what is more, the subject's sleep state can be evaluated while the subject is wearing the device without giving any stress to the subject.

The evaluation of the sleep state while sleeping like sleep disorders such as apnea syndrome and hypopnea in accordance with the finding gained by the inventors of the present application cannot be realized even by combining PTL 1 to PTL 4.

Specifically speaking, regarding the technology disclosed in PTL 1, it is required to retain the device around a nasal part. The technology disclosed in PTL 2 employs an earphone-type device, but this device only obtains biological information. PTL 2 neither discloses nor suggests the evaluation of the sleep state. Regarding the technology disclosed in PTL 3, it is required to wear a mask. PTL 4 calculates and presents the sleep state on the basis of sleep physiological data, but it neither discloses nor suggests insertion of a sensor into the auricle.

The present invention was devised in consideration of the above-described circumstances and aims at proposing a physiological state evaluation apparatus capable of acquiring the biological information efficiently, achieving high accuracy in the evaluation of the sleep state, and evaluating the subject's health condition while sleeping without giving any stress to the subject.

Means to Solve the Problems

In order to solve the above-described problems, a physiological state evaluation apparatus configured to partly enter into contact with an external auditory pore when mounted in a subject's auricle is designed to include: a bone conduction sound collection unit that collects, as an acoustic signal, a sound of vibrations generated from a larynx and a pharynx of the subject via a cartilage region of the external auditory pore of the subject; a blood condition measuring unit that optically detects a pulsatory motion of blood circulating through blood vessels of the subject and measures a pulse rate and blood oxygen saturation, respectively, on the basis of a change in optical intensity caused by the pulsatory motion; a biological signal detection unit that includes a pair of conductive electrodes for detecting electric potentials of right and left external auditory pore surfaces, respectively, of the subject and detects brain waves and eye movements of the subject; a respiratory condition detection unit that detects, as a respiratory condition, sound quality, the number of times, a tidal volume, and a rhythm of breaths of the subject on the basis of the acoustic signal by the bone conduction sound collection unit; and a sleep state evaluation unit that evaluates a health condition of the subject while sleeping on the basis of the respiratory condition detected by the respiratory condition detection unit, the pulse rate and the blood oxygen saturation measured by the blood condition measuring unit, and the brain waves and the eye movements detected by the biological signal detection unit.

According to the present invention, it becomes possible to efficiently and accurately evaluate the subject's health condition without giving any stress to the subject by using the earphone of the auricle insertion type, which causes no physical obstacles (or can perform measurements stably even when the subject is laying down) and measuring the subject's biological information while in bed.

The physiological state evaluation apparatus may further include further a body temperature detection unit that detects a tympanic membrane temperature of the subject according to an infrared ray system. The sleep state evaluation unit may evaluate the subject's health condition while sleeping on the basis of synchronization timing between the pulse rate measured by the blood condition measuring unit and the tympanic membrane temperature detected by the body temperature detection unit.

As a result, it becomes possible to determine the sleep state more accurately by making the determination in a complex manner by incorporating the synchronization timing between the measured pulse rate and the detected tympanic membrane temperature.

The sleep state evaluation unit may evaluate the subject's health condition while sleeping on the basis of components indicating a spoken voice and a coughing sound of the subject among the acoustic signal obtained by the bone conduction sound collection unit.

As a result, it becomes possible to determine the sleep state more accurately by making the determination in a complex manner by incorporating the subject's spoken voices and coughing sounds (for example, sickness related to the subject's throat such as coughs and dysphagia).

The physiological state evaluation apparatus may further include a bone conduction sound emission unit that transmits the acoustic signal, which is transformed to vibrations via a cartilage region of an external auditory canal of the subject, to an inner ear. The sleep state evaluation unit may output a feedback instruction content according to the subject's health condition as the acoustic signal to the bone conduction sound emission unit.

As a result, it becomes possible to transmit the feedback instruction content to the subject via the device itself for measuring the subject's biological information.

Advantageous Effects of the Invention

The subject's health condition while sleeping can be evaluated efficiently and accurately without giving any stress to the subject as described above by measuring the subject's biological information while in bed by using, as a vital sensor, the earphone(s) of the auricle insertion type which will not cause any physical obstacles.

DESCRIPTION OF EMBODIMENTS

Some embodiments of the present invention will be described below with reference to the drawings.

First Embodiment

Figure 1:
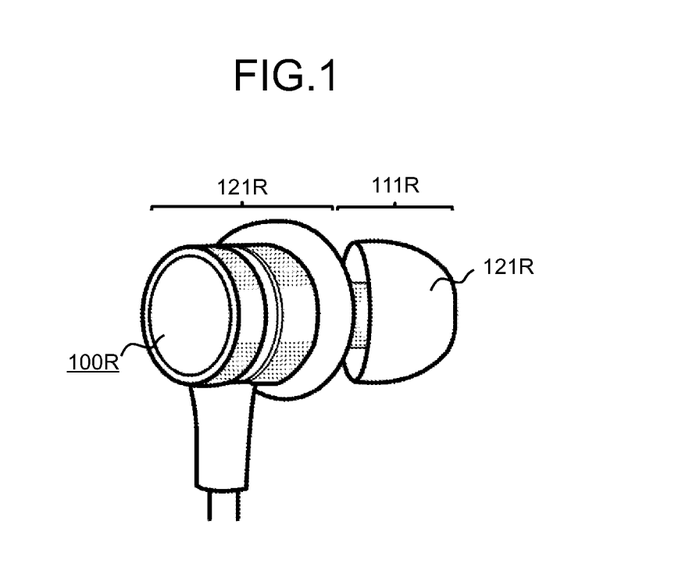
FIG. 1 is an external appearance perspective view of a right-side earphone included by a physiological state evaluation apparatus according to a first embodiment.
Figure 2:
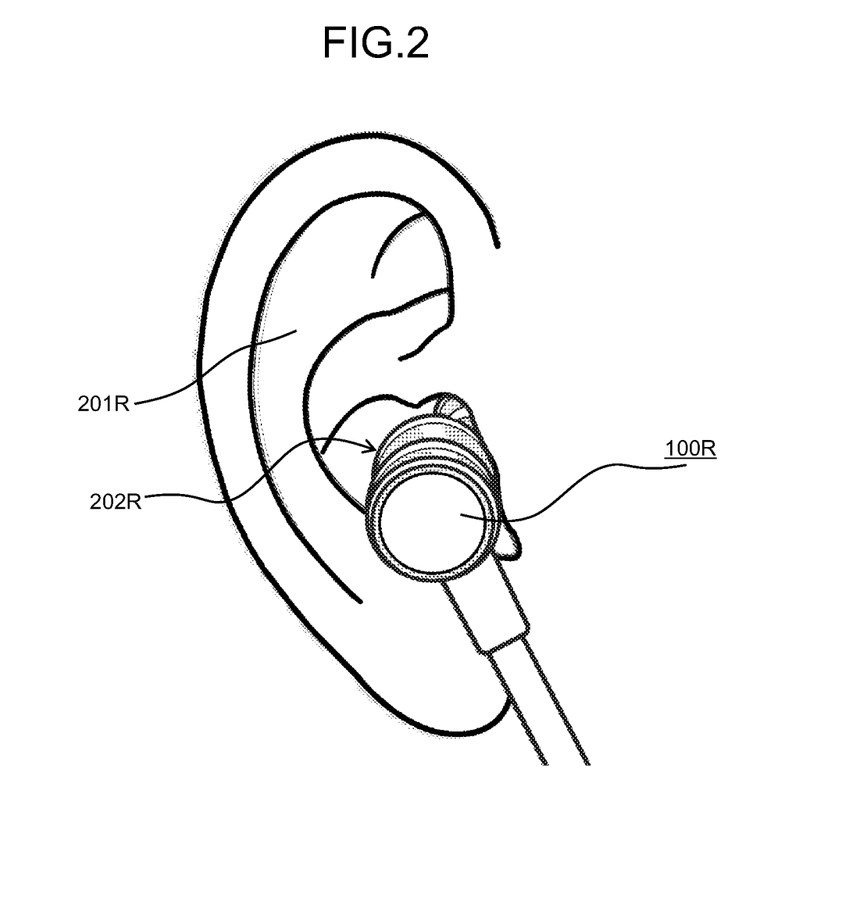
FIG. 2 is an external view of a subject' s right-side auricle in which the right-side earphone illustrated in FIG. 1 is mounted.

FIG. 1 is an external appearance perspective view of a right-side earphone included by a physiological state evaluation apparatus according to a first embodiment. FIG. 2 is an external view of a subject' s right-side auricle in which the right-side earphone illustrated in FIG. 1 is mounted. FIG. 1 and FIG. 2 representatively illustrate the external appearance of the right-side earphone and the external appearance of a left-side earphone is similar to that of the right-side earphone.

A right-side earphone 100R is mounted inside the subject's right-side auricle 201R and includes: a top end 111R which then enters into contact with an external auditory pore 202R (for example, enters into contact with a tragus or an antitragus); and a base end 112R coupled to the top end 112R.

The top end 111R has a plurality of types of sensors for respectively detecting (measuring) biological information. An ear pad 121R is attached to the top end 111R. The ear pad 121R is composed of electroconductive rubber and has at least one type of sensor (for example, a bone conduction microphone) among the above-mentioned plurality of types of sensors. Regarding each of the plurality of types of sensors, an electric signal indicating a value detected (measured) by the relevant sensor is transmitted via, for example, the ear pad 121R (electroconductive rubber) to the base end 112R.

Figure 3:
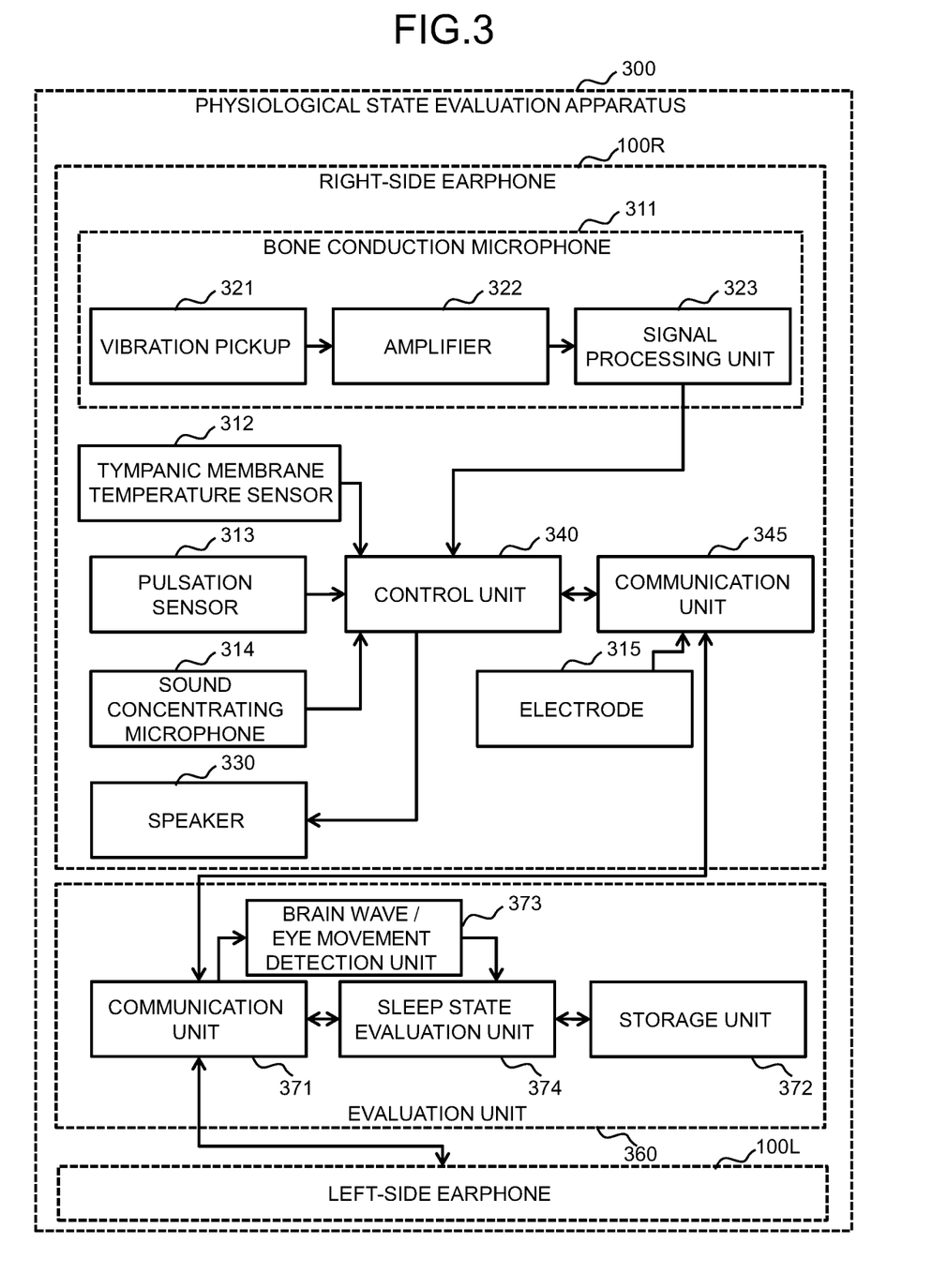
FIG. 3 is a configuration diagram of the physiological state evaluation apparatus according to the first embodiment.

FIG. 3 is a configuration diagram of the physiological state evaluation apparatus according to the first embodiment.

A physiological state evaluation apparatus 300 includes the right-side earphone 100R, a left-side earphone 100L, and an evaluation unit 360 which communicates with the right-side earphone 100R and the left-side earphone 100L.

Firstly, the configuration of each of the earphones 100R and 100L will be explained by taking the right-side earphone 100R as a representative example (since the configuration of the left-side earphone 100L is the same as that of the right-side earphone 100R, any detailed illustration and explanation about it are omitted).

The right-side earphone 100R includes, as an example of the aforementioned plurality of types of sensors, a bone conduction microphone 311, a tympanic membrane temperature sensor 312, a pulsation sensor 313, a sound concentrating microphone 314, and an electrode 315. Also, the right-side earphone 100R includes a control unit 340 and a communication unit 345. At least one (for example, all) of the bone conduction microphone 311, the tympanic membrane temperature sensor 312, the pulsation sensor 313, the sound concentrating microphone 314, and the electrode 315 is provided in, for example, the top end 111R (see FIG. 1). At least the control unit 340 and the communication unit 345 are provided in, for example, the base end 112R (see FIG. 1).

The bone conduction microphone 311 is one example of the bone conduction sound collection unit and collects, as an acoustic signal, a sound of vibrations generated from a subject's larynx and pharynx via a cartilage region of the subject's external auditory pore 202R (see FIG. 2). Specifically, for example, the bone conduction microphone 311 includes a vibration pickup 321, an amplifier 322, and a signal processing unit 323. The vibration pickup 321 is a piezoelectric vibration pickup (a piezoelectric acceleration pickup) which causes a piezoelectric element to enter into contact with a vibrating region (the external auditory pore 201R) and detects an electric potential generated in the piezoelectric element by deformation caused by the vibrations. A signal indicating such vibrations is amplified by the amplifier 322, specified processing is executed on the amplified signal by the signal processing unit 323, and the obtained signal is input to the control unit 340. Since outside sounds which are transmitted through aerial vibration are blocked by a human body, only spoken voice can be detected by the bone conduction microphone 311.

The tympanic membrane temperature sensor 312 is one example of the body temperature detection unit and detects the subject's tympanic membrane temperature according to an infrared ray system. An electric signal indicating the tympanic membrane temperature detected by the tympanic membrane temperature sensor 312 is input to the control unit 340. Incidentally, an ear hole temperature (a temperature inside the ear) is close to a brain temperature and reflects a (biological) rhythm produced by the brain; and if the ear hole temperature fluctuates in synchronization with a pulse rate, a person is in good health; and if both of them become out of rhythms, the person tends to become ill. Accordingly, since the tympanic membrane shares blood supply with a temperature regulatory center in the brain, that is, a hypothalamus, a core body temperature can be accurately reflected in the evaluation of the sleep state as described later by providing the tympanic membrane temperature sensor 312 which measures an infrared temperature of the tympanic membrane as in this embodiment. Changes in the core body temperature are reflected in the ears much faster and more accurately than at other regions.

The pulsation sensor 313 is a part of the blood condition measuring unit, specifically speaking, one example of a function that optically detects a pulsatory motion of blood circulating through the subject's blood vessels. The remaining part of the blood condition measuring unit, that is, a function that measures the pulse rate and the blood oxygen saturation, respectively, on the basis of changes in the optical intensity caused by the above-mentioned pulsatory motion is implemented by the control unit 340. Specifically, the control unit 340 detects (estimates) the pulse rate and the blood oxygen saturation, respectively, on the basis of the electric signal from the pulsation sensor 313 and the changes in the optical intensity caused by the pulsatory motion indicated by the electric signal. Incidentally, the above-mentioned remaining part of the blood condition measuring unit may be implemented by a processor (or a hardware circuit), which is not illustrated in the drawing), in the evaluation unit 360 in place of the control unit 340.

The sound concentrating microphone 314 collects the outside sounds, which are transmitted via the aerial vibration, as an acoustic signal. The sound concentrating microphone 314 is a part of the respiratory condition detection unit, that is, one example of a function that detects the subject's breath sound. The remaining part of the respiratory condition detection unit, that is, a function that detects the sound quality, the number of times, a tidal volume, and rhythm of the subject's breaths, as a respiratory condition, on the basis of the acoustic signal by the bone conduction sound collection unit is implemented by the control unit 340. Specifically speaking, the control unit 340 detects, as the respiratory condition, the sound quality, the number of times, the tidal volume, and the rhythm of the subject's breaths on the basis of the acoustic signal from the sound concentrating microphone 314 and the acoustic signal from the bone conduction microphone 311. Incidentally, the above-mentioned remaining part of the respiratory condition detection unit may be implemented by a processor (or a hardware circuit), which is not illustrated in the drawing), in the evaluation unit 360 in place of the control unit 340.

The electrode 315 detects an electric potential of the subject's right-side external auditory pore surface. Specifically speaking, the electrode 315 is one example of one (right-side) electrode of a pair of conductive electrodes (the pair of conductive electrodes which detect electric potentials of the subject's right and left external auditory pore surfaces, respectively) included by the biological signal detection unit. An electric signal from the electrode 315 is input to the evaluation unit 360 via the communication unit 345 (or via a path different from a communication path between the control unit 340 and the evaluation unit 360). The remaining part of the biological signal detection unit (the part other than the pair of conductive electrodes) is implemented by a brain wave/eye movement detection unit 373 in the evaluation unit 360. The brain wave/eye movement detection unit 373 detects the subject's brain waves and eye movements on the basis of an electric signal from the pair of conductive electrodes. It is necessary to short-circuit two positions, between which the brain is interposed, in order to detect the brain waves and the eye movements. So, when the earphones are placed in both auricles and additionally both the earphones 100R and 100L are connected with a wire as in this embodiment, the biological signal detection unit can be implemented.

The control unit 340 is implemented by at least one of: execution of one or more programs by a processor (which is not illustrated in the drawing) in the earphone 100R; and one or more hardware circuits in the earphone 100R. The control unit 340 detects (or measures) a plurality of types of biological information (for example, the tympanic membrane temperature, the pulse rate, the blood oxygen saturation, and the respiratory condition) on the basis of the signals from the bone conduction microphone 311, the tympanic membrane temperature sensor 312, the pulsation sensor 313, and the sound concentrating microphone 314 and transmits the detected biological information (for example, numerical values) to the evaluation unit 360 via the communication unit 345. Furthermore, the control unit 340 outputs the information from the evaluation unit 360 via a speaker 330. One example of at least part of the information from the evaluation unit 360 is feedback instruction content according to the subject's sleep state (the health condition while sleeping).

The communication unit 345 is communication interface equipment for the evaluation unit 360. A cable for communication with the evaluation unit 360 is connected to the communication unit 345.

The speaker 330 is one example of the bone conduction sound emission unit for transmitting the acoustic signal, which has been transformed to vibrations, to the inner ear via the cartilage region of the subject's external auditory canal. The speaker 330 outputs the feedback instruction content (acoustic signal) according to the subject's health condition, which is one example of the information from the control unit 340.

The explanation about the earphone 100R has been provided above. According to the above-described example, the control unit 340 detects (or measures) the biological information such as the tympanic membrane temperature, the pulse rate, the blood oxygen saturation, and the respiratory condition.

Under this circumstance, for example, the pulse rate, the blood oxygen saturation, and the respiratory condition are detected on the basis of <Breath Rules> and <Heart Rules> which are exemplified below. These <Breath Rules> and <Heart Rules> may, for example, be described in a program which exhibits the function as the control unit 340 by being executed by the processor or a storage unit (which is not illustrated in the drawing) in the earphone 100R may store information indicating the <Breath Rules> and <Heart Rules> and the processor may detect the pulse rate, the blood oxygen saturation, and the respiratory condition by referring to the relevant information. Incidentally, regarding the rules described below, each numerical value may be one example. Furthermore, physical information such as the subject's age, height, and weight may be transmitted to the earphone 100R (and 100L) via the evaluation unit 360 and the biological information may be detected by using such physical information. Furthermore, such physical information may be stored in the storage unit 372 in the evaluation unit 360 and be used to evaluate the sleep state. Furthermore, the information indicating the <Breath Rules> and the <Heart Rules> and the subject's physical information may be stored in the storage unit 372 for the evaluation unit 360 and the processor (which is not illustrated in the drawing) in the evaluation unit 360, instead of the control unit 340, execute one or more programs and thereby detect the plurality of types of biological information (for example, the tympanic membrane temperature, the pulse rate, the blood oxygen saturation, and the respiratory condition) on the basis of the signals from the bone conduction microphone 311, the tympanic membrane temperature sensor 312, the pulsation sensor 313, and the sound concentrating microphone 314 by referring to the information indicating the <Breath Rules> and the <Heart Rules> (the subject's physical information as necessary).

<Breath Rules>

(X1) Measurement of Event Duration: a respiratory cycle is measured in accordance with a breath sound timing. When a respiratory amplitude which serves as a reference cannot be identified easily and breathing fluctuations which serve as a reference are large and if the respiratory amplitude apparently continues to increase or the oxygen saturation decreases and a 2% or more improvement in the oxygen saturation is observed in association with an event, the event is assessed to be terminated.

(X2) Assessment of Apnea: The maximum signal swing in a temperature air flow estimated based on the respiratory cycle and the oxygen saturation has decreased by 90% or more from a base line before the event.

(X2a) If the criterion for the apnea is satisfied and an inspiratory effort continues or increases over the entire period of time while the air flow stops, it is assessed that the apnea is obstructive.

(X2b) If the criterion for the apnea is satisfied and the inspiratory effort is lost over the entire period of time while the air flow stops, it is assessed that the apnea is central.

(X2c) If the criterion for the apnea is satisfied and the inspiratory effort is lost at the initial part of the event and then the inspiratory effort is resumed, it is assessed that the apnea is of a mixed type.

(X3) Assessment of Hypopnea: a tidal volume estimated from the breath sounds is measured. Snores may be detected by the bone conduction microphone 311 together with the sound concentrating microphone 314.

(X3a) If the maximum signal swing decreases by 30% or more from the base line before the event and the 30% or more decrease of the signal amplitude continues for 10 seconds or more and the oxygen saturation decreases by 3% or more from the base line before the event or an arousal reaction is involved, it is assessed that the breath event is hypopnea.

(X3b) The event is assessed as obstructive hypopnea if any one of the following is satisfied: (i) snoring during the event: (ii) flattening of a measured signal of the tidal volume during inhalation of air increases as compared to the reference breath; and (iii) breath sounds indicating paradoxical movements of a thoracicoabdominal part, which was not recognized in the breaths before the event, are found during the event.

(X3c) If any of (i) to (iii) of (X3b) is not satisfied, the event is assessed as central hypopnea.

<Heart Rules>

(Y1) If a sinus heart rate of an adult continuously exceeds 90 times/minute, it is assessed as sinus tachycardia during sleep.

(Y2) If the sinus heart rate of a 6-year-old child to an adult continuously remains lower than 40 times/minute, it is assessed as bradycardia during sleep.

(Y3) If a person who is a 6-year-old child to an adult continues to remain in a cardiac standstill for longer than 3 seconds, it is assessed as cardiac arrest.

(Y4) If the heart rate exceeds 100 times/minute, QRS time is 120 msec or more, and the rhythm is comprised of three or more consecutive beats, it is assessed as frequent pulses with wide QRS.

(Y5) If the heart rate exceeds 100 times/minute, QRS time is less than 120 msec, and the rhythm is comprised of three or more consecutive beats, it is assessed as frequent pulses with narrow QRS.

(Y6) If the cardiac chamber rhythm is irregular and rapid up and down movements of different sizes, shapes, and appearance times are observed instead of constant p waves, it is assessed as atrial fibrillation.

The evaluation unit 360 is a communication device which performs wired communication with the earphones 100R and 100L. The evaluation unit 360 includes a communication unit 371, a storage unit 372, a brain wave/eye movement detection unit 373, and a sleep state evaluation unit 374. At least one of the brain wave/eye movement detection unit 373 and the sleep state evaluation unit 374 is implemented by at least one of: execution of one or more programs by the processor (which is not illustrated in the drawing) in the evaluation unit 360; and one or more hardware circuits in the evaluation unit 360.

The communication unit 371 is communication interface equipment for the earphones 100R and 100. A cable for communication with the earphones 100R and 100L is connected to the communication unit 371.

The storage unit 372 is one or more storage devices, for example, one or more memories. The storage unit 372 may include at least one nonvolatile storage device. The storage unit 372 may accumulate information indicating the results of evaluation by the sleep state evaluation unit 374 or accumulate information to which reference is made (or which is updated) by the sleep state evaluation unit 374 when evaluating the sleep state.

The brain wave/eye movement detection unit 373 detects the subject's brain waves and eye movements as described earlier on the basis of the electric signals from the pair of conductive electrodes (the electrode 315 in the right-side earphone 100R and the electrode [which is not illustrated in the drawing] in the left-side earphone 100L).

The sleep state evaluation unit 374 evaluates the sleep state on the basis of the respiratory condition, the pulse rate, and the blood oxygen saturation. Each of the "respiratory condition," the "pulse rate," and the "blood oxygen saturation" is the biological information detected by each of the earphones 100R and 100L and is one example of the information from the earphones 100R and 100L.

In this embodiment, the biological information for evaluating the subject's health condition is acquired while the subject is sleeping. The evaluation of the subject's health condition while sleeping is based on: the respiratory condition; the pulse rate and the blood oxygen saturation; and the brain waves and the eye movements. The respiratory condition is based on the sound quality, the number of times, the tidal volume, and the rhythm of the subject's breaths. The pulse rate and the blood oxygen saturation are based on the changes in the optical intensity caused by the pulsatory motion of the blood circulating through the subject's blood vessels. The brain waves and the eye movements are based on the signals from the pair of conductive electrodes which detect the electric potentials of the subject's right and left external auditory pore surfaces, respectively. In order to acquire these pieces of information efficiently and without giving any stress to the subject while the subject is sleeping, the earphones to be inserted into the subject's external auditory pores are implemented as vital sensors and an apparatus which evaluates the sleep state on the basis of the biological information from the above-described earphones is implemented as the physiological state evaluation apparatus 300. Specifically speaking, the physiological state evaluation apparatus 300 is implemented as a result of earnest examination from the various viewpoints of the inventors of the present application. The physiological state evaluation apparatus 300 makes it possible to evaluate the subject's sleep state efficiently and accurately without giving any stress to the subject.

Furthermore, in this embodiment, the sleep state evaluation unit 374 evaluates the sleep state on the basis of the synchronization timing between the pulse rate based on the measurement result of the pulsation sensor 313 and the tympanic membrane temperature based on the detection result of the tympanic membrane temperature sensor 312. If the ear hole temperature fluctuates in synchronization with the pulse rate, a person is in good health; and if both of them become out of rhythms, the person tends to become ill as described earlier. The vital sensor as the earphone is equipped with the tympanic membrane temperature sensor 312 in addition to the pulsation sensor 313. Consequently, it becomes possible to determine the sleep state more accurately.

Furthermore, in this embodiment, the sleep state evaluation unit 374: extracts the subject's spoken voices and coughing sounds from the acoustic signal from the bone conduction microphone 311 on the basis of the acoustic signal from the sound concentrating microphone 314 (that is, the detected outside sounds); and evaluates the sleep state on the basis of the spoken voice and the coughing sound. Consequently, the determination is made in a complex manner by incorporating the subject's spoken voices and coughing sounds (for example, sickness related to the subject's throat such as coughs and dysphagia); and as a result, it becomes possible to determine the sleep state more accurately. Incidentally, the subject's spoken voices and coughing sounds may be extracted by the control unit 340 instead of the sleep state evaluation unit 374.

Furthermore, in this embodiment, the sleep state evaluation unit 374 outputs, as the acoustic signal, the feedback instruction content according to the subject's health condition to the speaker 330 for the earphone 100R (and the speaker for the earphone 100L) on the basis of the evaluation result of the sleep state. Consequently, it becomes possible to transmit the feedback instruction content to the subject via the device itself for measuring the subject's biological information.

Incidentally, the feedback instruction content may be, for example, identified as follows. Specifically speaking, the storage unit 372 may store feedback control information in advance, which is information indicating the relationship between the evaluation result and the feedback instruction content. The sleep state evaluation unit 374 may identify the feedback instruction content, which matches the evaluation result of the sleep state, from the feedback control information and output the identified feedback instruction content to the speaker 330 for the earphone 100R (and the speaker for the earphone 100L).

Furthermore, in this embodiment, for example, the sleep state evaluation unit 374 may evaluate the subject's sleep state, for example, regularly on the basis of <Sleep Stage Assessment Rules> which are exemplified below (for example, the subject's sleep stage may be assessed and the sleep state may be evaluated on the basis of the subject's sleep time and a rate of each sleep stage during the sleep time). The <Sleep Stage Assessment Rules> exemplified below may be rules to be applied to adults. Whether the subject is an adult or not may be identified, for example, by the sleep state evaluation unit 374 from the aforementioned physical information. Furthermore, each numerical value may be one example regarding the following rules.

<Sleep Stage Assessment Rules>

These assessment rules are rules for judging whether a stage identified based on the subject's respiratory condition acquired while sleeping (on the basis of the sound quality, the number of times, the tidal volume, and the rhythm of the subject's breaths), the pulse rate and the blood oxygen saturation (on the basis of any changes in the optical intensity caused by the pulsatory motion of the blood circulating through the subject's blood vessels), and the brain waves and the eye movements (on the basis of the signals from the pair of conductive electrodes for detecting the electric potentials of the subject's right and left external auditory pore surfaces, respectively) corresponds to any one of the following five stages:

(1) Stage W (arousal);
(2) Stage N1 (non-REM 1);
(3) Stage N2 (non-REM 2);
(4) Stage N3 (non-REM 3); and
(5) Stage R (REM).

<<(1) Stage W (Arousal)>>

If either (1a) or (1b) below or both of them are detected regarding more than 50% of an epoch (a 30-second unit), the epoch is assessed as Stage W:

(1a) an alpha rhythm of an occipital region (an individual in which the alpha rhythm occurs when their eyes are open); and
(1b) other observations associated with Stage W (all individuals).

Incidentally, the "other observations" may be at least one of the following:

(1b-1) blinking (0.5 to 2 Hz);
(1b-2) rapid eye movements with normal or high jaw muscle strain; and
(1b-3) eye movements for reading.

Furthermore, the "alpha rhythm" (occipital region dominant rhythm of adults and elder children) us a continuous sine-wave activity of 8 to 13 Hz. The "blinking" is vertical eye movements of 0.5 to 2 Hz on both sides, which appear at the time of arousal or when the eyes are open or closed. The "rapid eye movements" are eye movements on the both sides indicating irregular and steep waves and duration of a first swing is normally less than 500 msec. The "eye movements for reading" are a series of eye movements on both sides, which make the transit from a slow phase to a rapid phase in the opposite direction when reading a book.

<<(2) Stage N1 (Non-REM 1)>>

Regarding an individual with whom the alpha rhythm is found, if the alpha rhythm decreases and an EEG activity (a low amplitude activity with a frequency of mainly 4 to 7 Hz) in which various frequencies coexist at a low amplitude occupies 50% or more of an epoch, the relevant epoch is assessed as Stage N1.

Regarding an individual with whom no alpha rhythm is found, if either one of the following phenomena (2a) and (2b) firstly appears, the relevant epoch is assessed as Stage N1 (non-REM 1):

(2a) the EEG activity of 4 to 7 Hz involving a background activity with a 1 Hz or more decrease from Stage W; and (2b) slow eye movements.

Incidentally, the "slow eye movements" are relatively regular sine-wave eye movements on both sides and the duration of a first swing is normally longer than 500 msec. Such slow eye movements are found at the arousal with the eyes opened and in Stage N1.

If most of the epoch satisfies the criteria for Stage N1 (the EEG activity in which various frequencies coexist at the low amplitude, LAMF) and no evidence for other sleep stages is found, the relevant epoch is assessed as Stage N1. Any subsequent epoch which involves the EEG activity in which various frequencies coexist at the low amplitude is assessed as Stage N1 until the evidence for another sleep stage (normally Stage W, Stage N2, or Stage R) appears.

When an arousal reaction interrupts Stage N2 sleep and if the EEG does not involve a K-complex or a sleep spindle, but indicates the activity where the various frequencies coexist at the low amplitude, a part immediately after the above-described activity is assessed as Stage N1 until any evidence for another sleep stage appears.

When the arousal reaction interrupts Stage R, and if the interruption is followed by the activity where the various frequencies coexist at the low amplitude, and the activity does not involve an occipital region dominant rhythm, but involves slow eye movements, a part including the eye movements is assessed as Stage N1 even if the jaw EMG activity remains low (at Stage R level). The assessment of Stage N1 continues until any evidence for another sleep stage which is normally Stage N2 or Stage R appears.

Incidentally, the "K-complex" is composed of clear negative sharp waves and an immediately following positive part and is clearly distinguished from the background EEG. The total duration is 0.5 seconds or more and the maximum amplitude is normally recorded as induced in a frontal region. The arousal reaction sometimes appears in association with the K-complex; however, the arousal reaction must start at the same time as the K-complex or within one second after the termination time point of the K-complex.

<<(3)Stage N2 (Non-REM 2)>>

If any one of the following (3a) and (3b) or both of them are recognized in a first half of an epoch or in a second half of an immediately preceding epoch, it is determined that the assessment of Stage N2 starts (when the criteria for N3 are not satisfied):

(3a) a K-complex which does not involve the arousal reaction; and (3b) a sleep spindle.

Incidentally, the "sleep spindle" is clear waves with the frequency of 11 to 16 Hz (mostly 12 to 14 Hz) and its duration is 0.5 seconds or more, and the maximum amplitude is normally found as induced in a central part.

If most of an epoch satisfies the criteria for Stage N2, that epoch is assessed as Stage N2. If the same waves as those of (3a) or (3b) are found or the arousal reaction is found in an immediately following epoch, the part immediately preceding the part in which the arousal reaction is found can be considered as Stage N2.

An epoch of EEG (LAMF) which does not involve any K-complex or sleep spindle, and in which the various frequencies coexist at the low amplitude is assessed as continuation of Stage N2 if any one of the above-mentioned (3a) and (3b) is recognized in an immediately preceding epoch or if the relevant epoch is not interrupted by the arousal reaction.

If an epoch which occurs immediately after Stage N3 and does not satisfy the criteria for Stage N3 is not interrupted by the arousal reaction and does not satisfy the criteria for Stage W or Stage R, it is assessed as Stage N2.

If any one of the following events (3c) to (3g) appears, the assessment of Stage N2 terminates:

(3c) transition to Stage W:

(3d) the arousal reaction, which is immediately followed by the EEG activity in which various frequencies coexist at the low amplitude (LAMF; the transition to Stage N1 until the K-complex or the sleep spindle which does not involve the arousal reaction occurs); this can be considered that the relevant epoch does not satisfy the criteria for Stage R;

(3e) a rough body motion, which is immediately followed by slow eye movements and the EEG activity in which various frequencies coexist at the low amplitude (LAMF) and does not involve any K-complex or sleep spindle which does not involve the arousal reaction (the epoch immediately after the rough body motion is assessed as Stage N1; and if the slow eye movements are not found, the relevant epoch is assessed as Stage N2); incidentally, the "the rough body motion" is a body motion regarding which the EEG activity of a half or more of the epoch becomes ambiguous due to an artifact by the body motion and a muscular activity and it becomes impossible to assess the sleep stage (if the alpha rhythm is recognized even in a part of the epoch [with the duration of less than 15 seconds], it is assessed as Stage W);

(3f) transition to Stage N3; and (3g) transition to Stage R.

<<(4)Stage N3 (Non-REM 3)>>

If a slow wave activity is recognized in 20% or more of an epoch, the relevant epoch is assessed as Stage N3 regardless of the age.

Incidentally, the "slow wave activity" is waves with the frequency of 0.5 Hz, its amplitude between peaks exceeds 75 μV, and the slow wave activity is measured in a frontal region with reference to the ear on the opposite side or a mastoid.

<<(5)Stage R (REM)>>

If all the following phenomena (5a) to (5c) are recognized in an epoch, the relevant epoch is assessed as Stage R (confirmed Stage R):

(5a) the EEG activity where the LAMF which does not involve any K-complex or sleep spindle coexists;

(5b) accompaniment of low jaw EMG strain and rapid eye movements in most part of the epoch; and (5c) the rapid eye movements at every position in the epoch.

Incidentally, the "low jaw EMG strain" is a state where the EMG activity in the base line as induced in the jaw is not higher than any other sleep stages.

If a sleep part preceding and adjacent to the epoch of the confirmed Stage R has no rapid eye movements and all of the following (5d) to (5g) are recognized, it is assessed as Stage R:
- (5d) if the EEG indicates the LAMF which does not involve any K-complex or sleep spindle;
- (5e) the low jaw EMG strain (Stage R level);
- (5f) no interruption by the arousal reaction; and
- (5g) if it does not involve any slow eye movements immediately after the arousal reaction or Stage W.

If a part which satisfies the criteria for Stage R is recognized in most part of the relevant epoch, that epoch is assessed as Stage R. Stage R rules are prioritized over Stage N2 rules.

If a sleep part immediately after one or more epochs of the confirmed Stage R does not have the rapid eye movements and all of the following (5h) to (5j) are recognized, it is assessed as continuance of Stage R:
- (5h) if the EEG indicates the LAMF which does not involve any K-complex or sleep spindle;
- (5i) the low jaw EMG strain (Stage R level) in most part of the epoch; and
- (5j) no interruption by the arousal reaction.

If one or more events of the following (5k) to (5o) appear, Stage R is considered to terminate:
- (5k) transition to Stage W or N3;
- (5l) if an increase in the jaw EMG at Stage R level or higher is recognized in most part of the relevant epoch and the criteria for Stage N1 are satisfied;
- (5m) if the arousal reaction occurs and the LAMF and the slow eye movements are found immediately after the arousal reaction (the epoch is assessed as Stage N1; and if there is no slow eye movement and the jaw EMG remains at a low value, it is continuously assessed as Stage R);
- (5n) if any K-complex or sleep spindle which does not involve the arousal reaction is not found in the slow eye movements and the LAMF subsequent to the rough body motion (the epoch immediately after the rough body motion is assessed as Stage N1; and if no slow eye movement is found and the jaw EMG remains at a low value, it is continuously assessed as Stage R); and
- (5o) if one or more K-complexes and/or sleep spindles which do not involve the arousal reaction appear in a first half of the epoch and the jaw EMG remains as a low value, but there is no rapid eye movements (the epoch is assessed as Stage N2).

In addition to degradation of the jaw EMG activity, a part where the rapid eye movements, the sleep spindles, and the K-complexes coexist is assessed as the following (5p) to (5r). (5p) A part between two K-complexes, two spindles, or a K-complex and a sleep spindle, which does not involve any interruption by the rapid eye movements, can be considered as Stage N2.

(5q) A part where the rapid eye movements which do not involve any K-complex or sleep spindle, and the sleep-level jaw strain are observed can be considered as Stage R.

(5r) If a part which can be considered as Stage N2 is observed in most of the epoch, it is assessed as Stage N2. If a part which can be considered as Stage R is observed in most of the epoch, it is assessed as Stage R.

Second Embodiment

A second embodiment will be explained. In the following explanation, the difference from the first embodiment will be mainly explained and an explanation about points in common with the first embodiment will be omitted or simplified (the same also applies to an explanation of a third embodiment).

Figure 4:
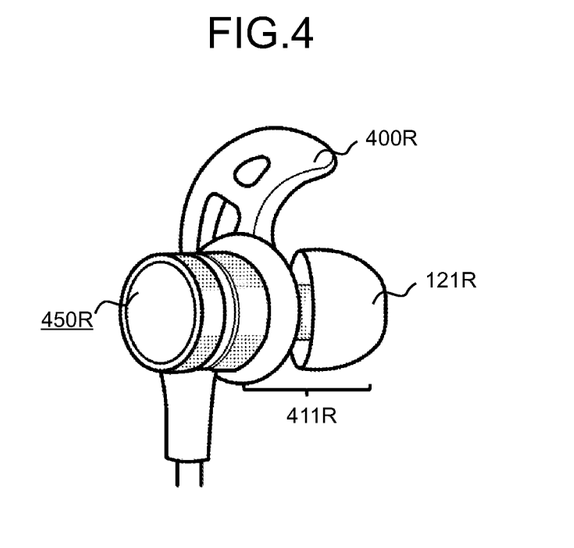
FIG. 4 an external appearance perspective view of a right-side earphone included by a physiological state evaluation apparatus according to a second embodiment.
Figure 5:
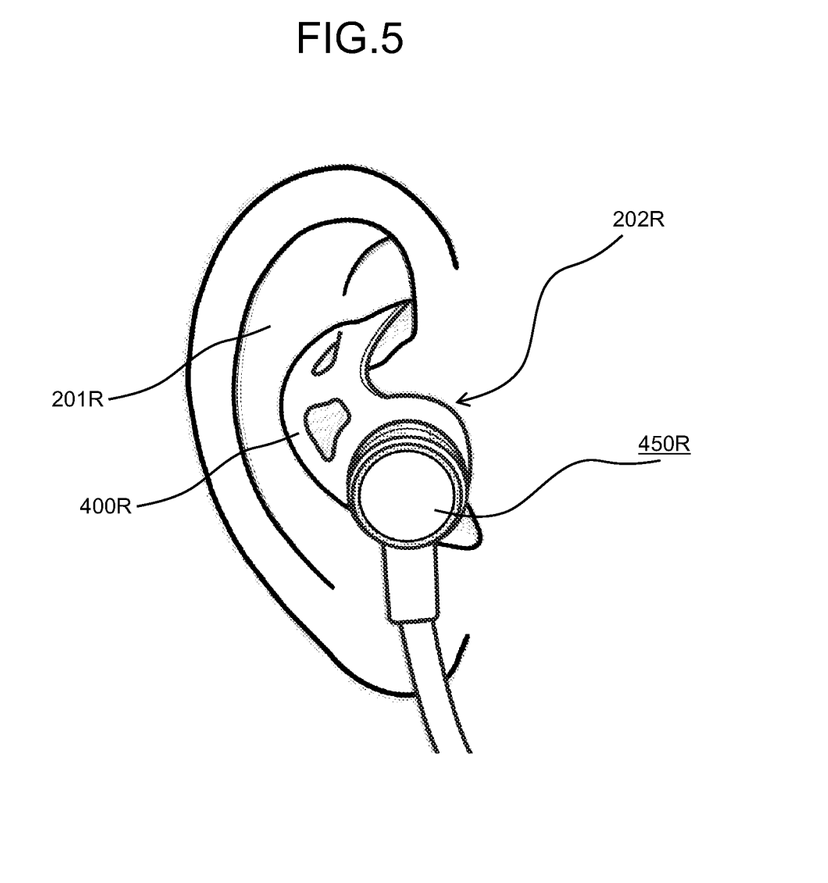
FIG. 5 is an external view of the subject's right-side auricle in which the right-side earphone illustrated in FIG. 4 is mounted.

FIG. 4 is an external appearance perspective view of a right-side earphone included by a physiological state evaluation apparatus according to a second embodiment. FIG. 5 is an external view of the subject's right-side auricle in which the right-side earphone illustrated in FIG. 4 is mounted.

An ear hook (for example, an ear hook which is inserted between an upper leg and an lower leg of an antihelix and is caused to enter into contact with, and be secured to, the backside of the upper leg) 400R is provided on a base end side of a top end 411R of a right-side earphone 450R. In addition to the ear pad 121R, the ear hook 400R is also composed of the electroconductive rubber. The ear hook 400R includes at least one type of sensor (for example, a bone conduction microphone) among the aforementioned plurality of types of sensors.

According to this embodiment, it is possible to reduce the possibility that the earphone 450R may fall off from the auricle while sleeping and the sleep state may thereby fail to be evaluated.

Third Embodiment

Figure 6:
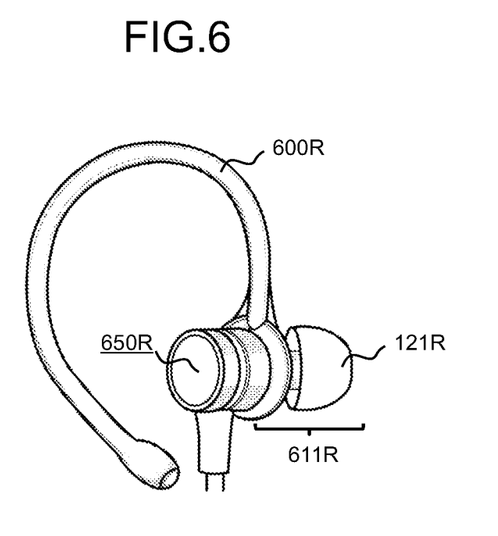
FIG. 6 is an external appearance perspective view of a right-side earphone included by a physiological state evaluation apparatus according to a third embodiment.
Figure 7:
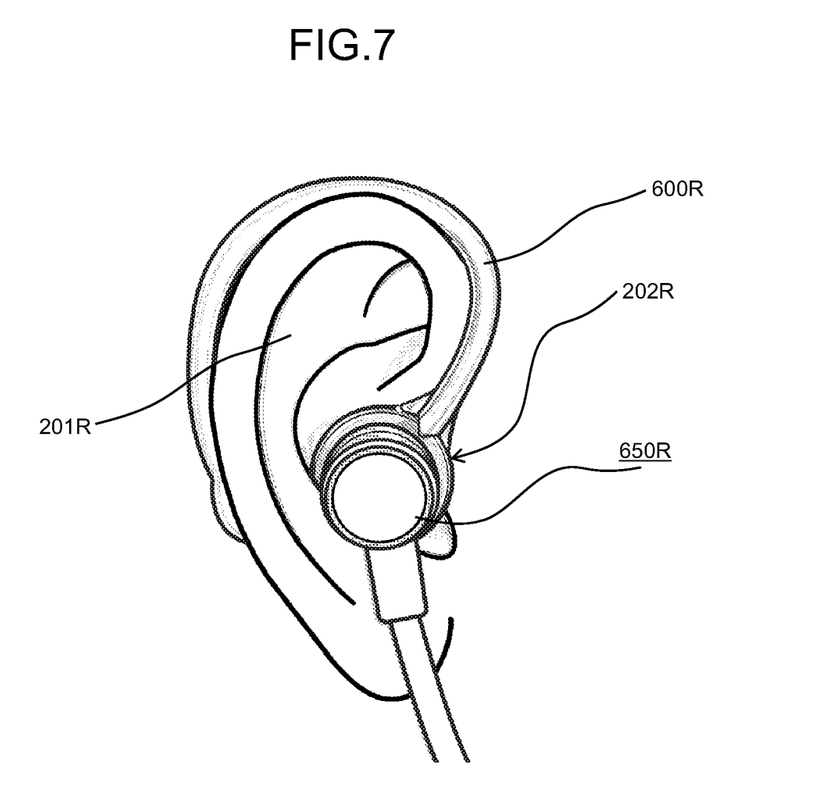
FIG. 7 is an external view of the subject's right-side auricle in which the right-side earphone illustrated in FIG. 6 is mounted.

FIG. 6 is an external appearance perspective view of a right-side earphone included by a physiological state evaluation apparatus according to a third embodiment. FIG. 7 is an external view of the subject's right-side auricle in which the right-side earphone illustrated in FIG. 6 is mounted.

A right-side earphone 650R includes an ear hook (a member which is to be hanged on the backside of the auricle along the backside of the helix) 600R. The ear hook 600R extends from the base end side of a top end 611R of the right-side earphone 650R and extends along the backside of the helix and then reaches the backside of the auricle. In addition to the ear pad 121R, the ear hook 600R is also composed of the electroconductive rubber. The ear hook 600R includes at least one type of sensor (for example, a bone conduction microphone) among the aforementioned plurality of types of sensors.

According to this embodiment, it is possible to reduce the possibility that the earphone 650R may fall off from the auricle while sleeping and the sleep state may thereby fail to be evaluated.

Some embodiments have been explained above; however, these embodiments are examples illustrated for the purpose of explaining the present invention and there is no intention to limit the scope of the present invention to only these embodiments. The present invention can be also executed in other various forms.

For example, in at least one of the first embodiment to the third embodiment, at least one of the following may be adopted.

At least one of the tympanic membrane temperature sensor 312, the sound concentrating microphone 314, the electrode 315, the speaker 330, and the brain wave/eye movement detection unit 373 may not exist.

The earphones 100R and 100L may not have the same configuration. For example, the pulsation sensor 313 may exist in the right-side earphone 100R, but may not exist in the left-side earphone 100L; and the bone conduction microphone 311 may not exist in the right-side earphone 100R, but may exist in the left-side earphone 100L.

At least one of the earphones 100R and 100L may not exist.

The communication between the earphones 100R and 100L and the evaluation unit 360 may be wireless communication.

The equipment itself for implementing the evaluation unit 360 may be a computer such as a smartphone and may not be a so-called exclusive device for the physiological state evaluation apparatus 300. In this case, at least the sleep state evaluation unit 374 may be implemented by a processor within the computer by executing a program such as an application program.

Furthermore, for example, the sleep state evaluation unit 374 may accumulate the feedback instruction content in the storage unit 372 and output the feedback instruction content as the acoustic signal to the speaker 330 (one example of the bone conduction sound emission unit) when the occurrence of a specified event (for example, an event designated by the subject in advance) is estimated from a detection result of at least one of the plurality of types of sensors possessed by the earphones 100R and 100L (or a timer which is not illustrated in the drawing) (for example, when it is presumed that the subject has woken up or when the time designated by the subject in advance has come). Consequently, it becomes possible to transmit the feedback instruction content to the subject at an appropriate timing for the subject without interrupting the subject's sleep.

REFERENCE SIGNS LIST

100R: right-side earphone
100L: left-side earphone
300: physiological state evaluation apparatus
360: evaluation unit

The invention claimed is:

1. A system that evaluates a health condition of a subject while minimizing stress to the subject, the system comprising:
an earphone configured to at least partially contact an external auditory pore when mounted in an auricle of the subject,
a first sensor that is a contact acoustic transducer configured to mechanically coupled to a cartilage region of the external auditory pore and configured to collect an acoustic signal representing structure-borne vibrations generated from a larynx and a pharynx of the subject;
a second sensor configured to measure optical intensity and to optically detect a pulsatory motion of blood circulating through blood vessels of the subject;
a third sensor configured to measure temperature and utilizing an infrared system to detect a temperature of a tympanic membrane of the subject;
a communication interface communicatively coupled to the first sensor, the second sensor, and the third sensor;
a memory; and
a processor that is communicatively coupled to the communication interface and the memory, wherein the processor is configured to:
receive the acoustic signal from the first sensor;
determine a pulse rate and a blood oxygen saturation; based on a change in optical intensity caused by the pulsatory motion detected by the second sensor, and store the pulse rate and the blood oxygen saturation in the memory;
detect respiratory parameters of the subject based on the acoustic signal, the respiratory parameters including at least one of a respiratory condition, sound quality, a number of breaths, a tidal volume, or a rhythm of breaths;
detect the temperature of the tympanic membrane based on a signal received from the third sensor;
generate a pulse waveform from the second sensor and a tympanic-temperature waveform from the third sensor;
band-pass filter the tympanic-temperature waveform to isolate heartbeat-scale components;
compute, over successive analysis windows, a synchronization timing defined as a time lag corresponding to a maximum of a normalized cross-correlation between the pulse waveform and the band-pass-filtered tympanic-temperature waveform, and compute a synchronization score as at least one of a normalized correlation value or a magnitude-squared coherence; and
evaluate a health condition of the subject while sleeping based on the synchronization timing and the synchronization score with respect to a predetermined threshold.

2. The system according to claim 1, wherein the processor is further configured to:
analyze the acoustic signal to detect a spoken voice or a coughing sound of the subject, and wherein the health condition of the subject while sleeping is further based on a presence of the spoken voice or the coughing sound.

3. The system according to claim 1, wherein the processor is further configured to:
output a feedback instruction in response to the health condition of the subject by vibrating the cartilage region of the external auditory pore of the subject.

4. The system according to claim 1, wherein:
when the synchronization timing indicates that the pulse rate and fluctuations of the temperature of the tympanic membrane are synchronized, the health condition of the subject is evaluated to be in good health.

5. The system according to claim 1, wherein:
when the synchronization timing indicates that the pulse rate and fluctuations of the temperature of the tympanic membrane are not synchronized, the health condition of the subject is evaluated to be in poor health.

6. The system according to claim 1, wherein:
the communication interface is further communicatively coupled to a fourth sensor, and
the processor is further configured to detect brain waves and eye movements of the subject based on biological signals generated by the fourth sensor, wherein the fourth sensor includes a pair of conductive electrodes configured to detect electric potentials at right and left external auditory pore surfaces of the subject, respectively.

7. The system according to claim 6, wherein the processor is further configured to evaluate the health condition of the subject while sleeping based on at least one of the brain waves and the eye movements of the subject.

8. The system according to claim 1, wherein the processor is further configured to evaluate the health condition of the subject while sleeping based on the respiratory parameters of the subject.

9. The system of claim 1, wherein an absolute value of the synchronization timing is constrained to a predetermined physiologic range, and wherein the synchronization score is computed over a frequency band associated with a heart rate.

10. The system of claim 1, wherein the synchronization timing and the synchronization score are computed only during non-REM sleep epochs.

11. The system of claim 10, wherein non-REM sleep is determined from brain waves and/or eye movements detected by the fourth sensor of claim 6.

12. The system of claim 1, wherein the first sensor comprises a bone-conduction microphone or a contact accelerometer and is configured to reject airborne sound relative to structure-borne vibration.

* * * * *